(12) United States Patent
Gielisch et al.

(10) Patent No.: US 10,173,462 B2
(45) Date of Patent: Jan. 8, 2019

(54) RIM ASSEMBLY

(71) Applicant: Bayerische Motoren Werke Aktiengesellschaft, Munich (DE)

(72) Inventors: Sebastian Gielisch, Unterschleissheim (DE); Robert Loch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/844,881

(22) Filed: Sep. 3, 2015

(65) Prior Publication Data
US 2016/0001593 A1 Jan. 7, 2016

Related U.S. Application Data

(63) Continuation of application No. PCT/EP2014/052930, filed on Feb. 14, 2014.

(30) Foreign Application Priority Data

Mar. 4, 2013 (DE) .................. 10 2013 003 690

(51) Int. Cl.
*B60B 7/06* (2006.01)
*B60B 7/02* (2006.01)
*B60B 7/08* (2006.01)

(52) U.S. Cl.
CPC ............... *B60B 7/063* (2013.01); *B60B 7/02* (2013.01); *B60B 7/06* (2013.01); *B60B 7/061* (2013.01);

(Continued)

(58) Field of Classification Search
CPC .. B60B 7/00; B60B 7/06; B60B 7/061; B60B 7/063; B60B 7/08; B60B 7/02; B60B 7/066

(Continued)

(56) References Cited

U.S. PATENT DOCUMENTS 2,226,511 A  12/1940 Hollerith
5,490,342 A * 2/1996 Rutterman ............ G09F 21/045
                                                301/37.25

(Continued)

FOREIGN PATENT DOCUMENTS

CN   2639032 Y   9/2004
CN   1709722 A   12/2005

(Continued)

OTHER PUBLICATIONS

Chinese Office Action issued in Chinese counterpart application No. 201480003603.5 dated Jun. 28, 2016, with English translation (Fourteen (14) pages).

(Continued)

*Primary Examiner* — Jason R Bellinger
*Assistant Examiner* — Scott A Browne
(74) *Attorney, Agent, or Firm* — Crowell & Moring LLP

(57) ABSTRACT

The invention relates to a rim assembly for a vehicle having a rim having an axial inside facing the vehicle and an axial outside facing away from the vehicle, a rim flange designed on the axial outside of the rim, and a first groove designed in the rim. The first groove is arranged in the rim flange or axially outside of the rim flange, and a disc-shaped cover, which covers the axial outside of the rim. The radially outer edge of the cover inserts in the first groove and a first elastic element in the first groove clamps the radial outside edge.

11 Claims, 4 Drawing Sheets

(52) U.S. Cl.
CPC ............... B60B 7/066 (2013.01); B60B 7/08 (2013.01); *B60B 2320/50* (2013.01); *B60B 2900/1216* (2013.01)

(58) Field of Classification Search
USPC ..... 301/37.101, 37.102, 37.31, 37.12, 37.35, 301/37.36
See application file for complete search history.

(56) References Cited

U.S. PATENT DOCUMENTS

| | | | | |
|---|---|---|---|---|
| 6,179,387 | B1* | 1/2001 | Nasset, Sr. | B05B 15/0487 118/504 |
| 6,209,204 | B1* | 4/2001 | Eikhoff | B60B 31/02 29/894.381 |
| 7,416,260 | B1* | 8/2008 | Cuevas | B60B 7/08 301/37.106 |
| 7,448,695 | B1 | 11/2008 | Wolf | |
| 2011/0115280 | A1* | 5/2011 | Mercat | B60B 1/003 301/55 |
| 2011/0181101 | A1* | 7/2011 | Sicilia | B60B 7/0013 301/108.1 |
| 2012/0177312 | A1 | 7/2012 | Aritake et al. | |
| 2013/0334869 | A1* | 12/2013 | Kronemeyer | B60B 7/06 301/37.102 |

FOREIGN PATENT DOCUMENTS

| | | | |
|---|---|---|---|
| CN | 102211498 A | 10/2011 | |
| CN | 102575715 B | 4/2015 | |
| DE | 28 13 412 A1 | 10/1979 | |
| DE | 29 07 622 A1 | 8/1980 | |
| DE | 82 17 015 U1 | 9/1982 | |
| DE | 8217015 U1 * | 9/1982 | ............... B60B 7/02 |
| DE | 195 24 672 A1 | 2/1996 | |
| DE | 10 2009 030 059 A1 | 12/2010 | |
| EP | 0 763 436 A1 | 3/1997 | |
| FR | 1.355.663 A | 3/1964 | |
| WO | WO 03/093030 A1 | 11/2003 | |

OTHER PUBLICATIONS

International Search Report dated May 28, 2014 (Two (2) pages).
German Search Report dated Sep. 11, 2013, with Statement of Relevancy (Six (6) pages).
Chinese Office Action issued in Chinese counterpart application No. 201480003603.5 dated Mar. 21, 2017, with English translation (Fourteen (14) pages).

* cited by examiner

RIM ASSEMBLY

CROSS REFERENCE TO RELATED APPLICATIONS

This application is a continuation of PCT International Application No. PCT/EP2014/052930, filed Feb. 14, 2014, which claims priority under 35 U.S.C. § 119 from German Patent Application No. 10 2013 003 690.9, filed Mar. 4, 2013, the entire disclosures of which are herein expressly incorporated by reference.

BACKGROUND AND SUMMARY OF THE INVENTION

The present invention relates to a rim assembly with a rim and a covering, and to a method for installing the rim assembly.

In the prior art, steel rims customarily have wheel caps which, for example, are clipped into the rim radially within the hump. By way of example, document DE 8217015 U shows a covering for light metal wheels, the covering protecting the rim from soiling.

It is an object of the present invention to specify a rim assembly which permits an operationally reliable and at the same time aerodynamically optimized configuration along with cost-effective production and installation. Furthermore, it is the object of the present invention to specify a cost-effective and efficient installation method for the rim assembly.

The object is achieved by the combination of features of the independent claims. The dependent claims relate to advantageous developments of the invention.

The object is therefore achieved by a rim assembly for a vehicle, comprising a rim and a disk-shaped covering. An axial inner side which is to face the vehicle and an axial outer side which is to face away from the vehicle are defined on the rim. The axial outer side is visible for a person looking at the vehicle. A rim flange is formed on the axial outer side of the rim. Furthermore, the rim has a first groove. This first groove is in particular arranged around the entire circumference and is therefore of annular design. The first groove is located in the rim flange or axially outside the rim flange. The disk-shaped covering is inserted into the first groove, and therefore a radially outer edge of the covering is inserted in the first groove. The radially outer edge of the covering is preferably likewise annular, and therefore the radially outer edge of the covering is inserted along the entire circumference in the first groove. By positioning the first groove on the rim flange or axially outside the rim flange, it is ensured that the covering is positioned as far on the outside of the rim as possible. As a result, it is possible to cover the rim, in particular in the region of the spokes, and therefore an aerodynamically optimum design of the rim assembly is produced. At the same time, soiling of the rim and possible corrosion are therefore also prevented. The covering is clamped within the first groove with a first elastic element, preferably made of rubber. The first elastic element permits simple installation and subsequent removal of the covering. Furthermore, the first elastic element ensures an operationally fixed and fluid-tight connection between the covering and the first groove. By way of the fluid-tight connection, the interior of the rim can be designed to be sealed, and therefore corrosion is prevented.

It is preferably provided that the first elastic element is vulcanized or adhesively bonded onto the radially outer edge of the covering. The vulcanizing or adhesive bonding of the first elastic element thereon has decisive advantages for the installation of the covering. The covering with the elastic element vulcanized or adhesively bonded thereon can be premanufactured and, during the final installation, merely has to be inserted into the rim. The first elastic element at the same time ensures that the covering is centered. Furthermore, the covering can be removed again without destruction. The first elastic element remains here on the radially outer edge of the covering.

Furthermore, it is preferably provided that the first elastic element is arranged in its entirety around the radially outer edge of the covering. As a result, a secure and fluid-tight connection between the covering and the rim is possible.

The first elastic element advantageously engages around the radially outer edge of the covering. By way of this engagement therearound, a first part of the first elastic element bears on the axial inner side of the covering. A second part of the first elastic element bears on the axial outer side of the covering. By way of the engagement around the radially outer edge, the first elastic element fixes the covering in both axial directions.

Furthermore, it is preferably provided that, on the axial outer side of the first groove, a wall of the first groove is formed by a web of the rim. A radially inner end is defined on the web. A certain oblique portion of the covering lies opposite the radially inner end of the web. This oblique portion of the covering at least partially extends in the axial direction. The first elastic element comprises a third part which is clamped between the end of the web and the oblique portion of the covering. As a result, the first elastic element also fixes the covering in the radial direction.

The first groove is preferably designed in such a manner that the groove is open in the radial direction towards the center of the rim. As a result, simple installation of the covering, for example by cambering the covering, is possible.

Since the covering and the rim can have different coefficients of thermal expansion, it is preferably provided that the first elastic element in the first groove has a clearance in the radial direction. This clearance is preferably at least 1 mm, particularly preferably at least 2 mm. The clearance is provided in all of the radial directions. For a secure mounting of the covering with a sufficient clearance, the groove is deeper in the radial direction than the width in the axial direction.

The covering is preferably of annular design. By way of the annular design, the covering has a central recess. This central recess serves as an opening for the hub of the rim and/or as access to fastening holes of the rim. The hub and/or the fastening holes are preferably covered by a separate cover. This cover can readily be removed, and therefore the rim can be fitted on and removed from the vehicle.

By way of the annular configuration of the covering, a radially inner edge of the covering arises at the central recess. This radially inner edge of the covering preferably sits in a second groove of the rim. The second groove of the rim is preferably configured around the entire circumference and therefore annularly. The second groove of the rim is preferably open outward in the radial direction. A second elastic element is preferably provided for the secure seating of the radially inner edge of the covering in the second groove. The second elastic element preferably extends along the entire circumference of the radially inner edge of the covering.

The second elastic element is advantageously also vulcanized or adhesively bonded onto the radially inner edge of the covering, and therefore simple installation and a tight connection are possible.

In a preferred embodiment, it is provided that the second elastic element engages around the radially inner edge of the covering such that the second elastic element bears on the axial inner side of the covering and on the axial outer side of the covering. As a result, the covering is supported in both axial directions.

The covering is preferably composed of fiber-reinforced plastic. For this purpose, glass-fiber-reinforced or carbon-fiber-reinforced plastic is particularly preferably selected. The rim is preferably composed of light metal, in particular of an aluminum alloy or magnesium alloy.

The invention furthermore comprises a method for installing a rim assembly, comprising the following steps: (i) cambering a disk-shaped covering such that the outside diameter of the covering is reduced, (ii) positioning the covering on a rim having a first groove, and (iii) releasing the camber such that a radially outer edge of the covering slides into the first groove, wherein a first elastic element is provided in the first groove for clamping the radially outer edge.

The dependent claims and the advantageous refinements of the rim assembly according to the invention are correspondingly advantageously used in the method according to the invention.

The first elastic element is preferably vulcanized or adhesively bonded onto the radially outer edge of the covering before the camber is released, in particular before the camber is applied.

In order to camber the covering, a grip is taken up in particular in the central recess of the covering and a counterhold in the outer region, and therefore the corresponding force for the camber can be applied to the covering.

The cambering of the covering for the installation operation permits a very rapid and reliable positioning of the covering.

With the exception of the central recess, the covering constitutes a closed surface and therefore completely covers the axial outer side of the rim between the hub and the rim flange. As a result, air vortices are very substantially avoided in the rim, and an aerodynamically optimized rim assembly is produced.

Further details, features and advantages of the invention emerge from the description below and the figures, in which:

Other objects, advantages and novel features of the present invention will become apparent from the following detailed description of one or more preferred embodiments when considered in conjunction with the accompanying drawings.

DETAILED DESCRIPTION OF THE DRAWINGS

An exemplary embodiment of a rim assembly 1 is explained below in detail with reference to FIGS. 1 to 4. The rim assembly 1 is composed of a rim 2 and a covering 3.

Figure 1:
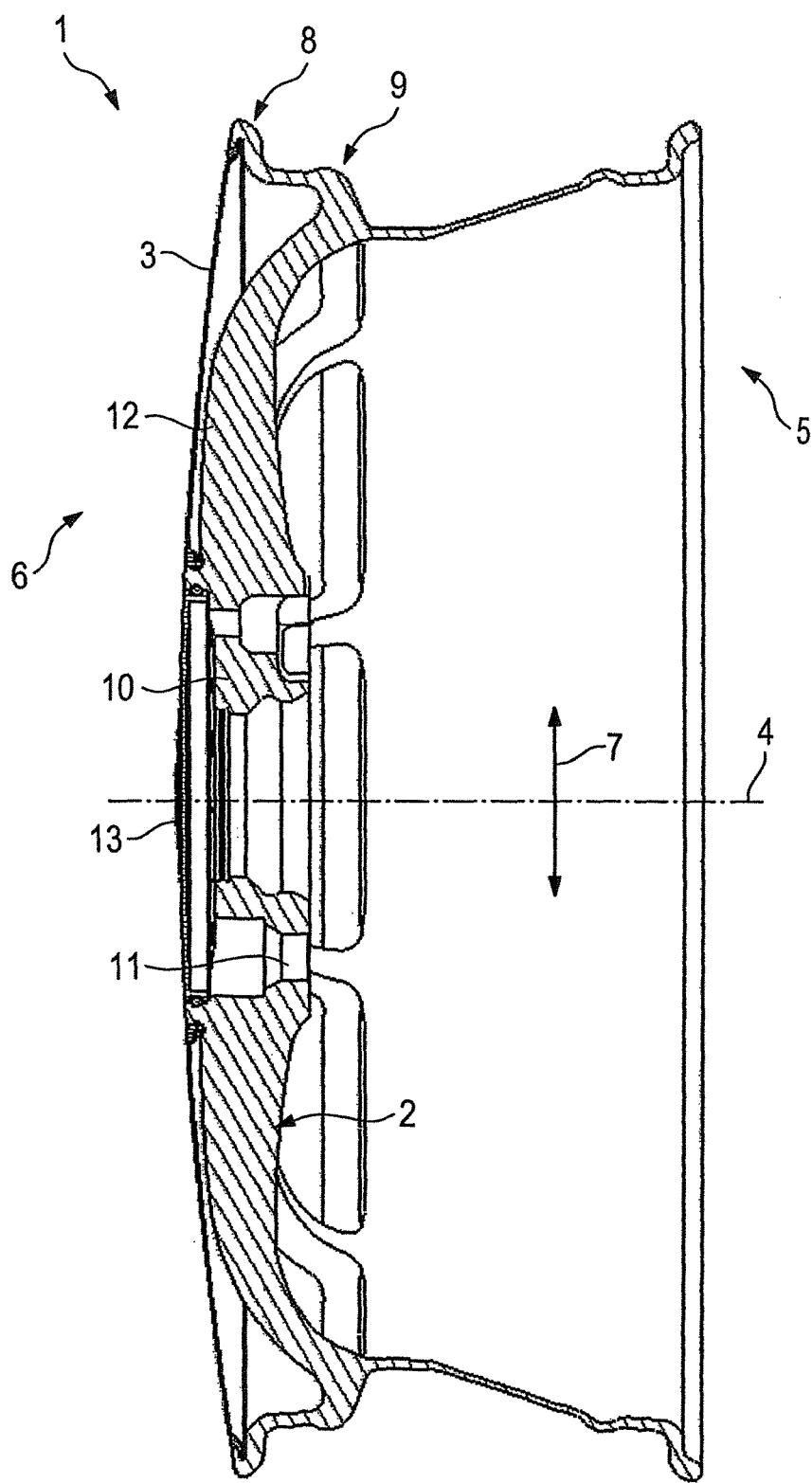
FIG. 1 shows a sectional view of an exemplary embodiment of a rim assembly according to the invention.
Figure 2:
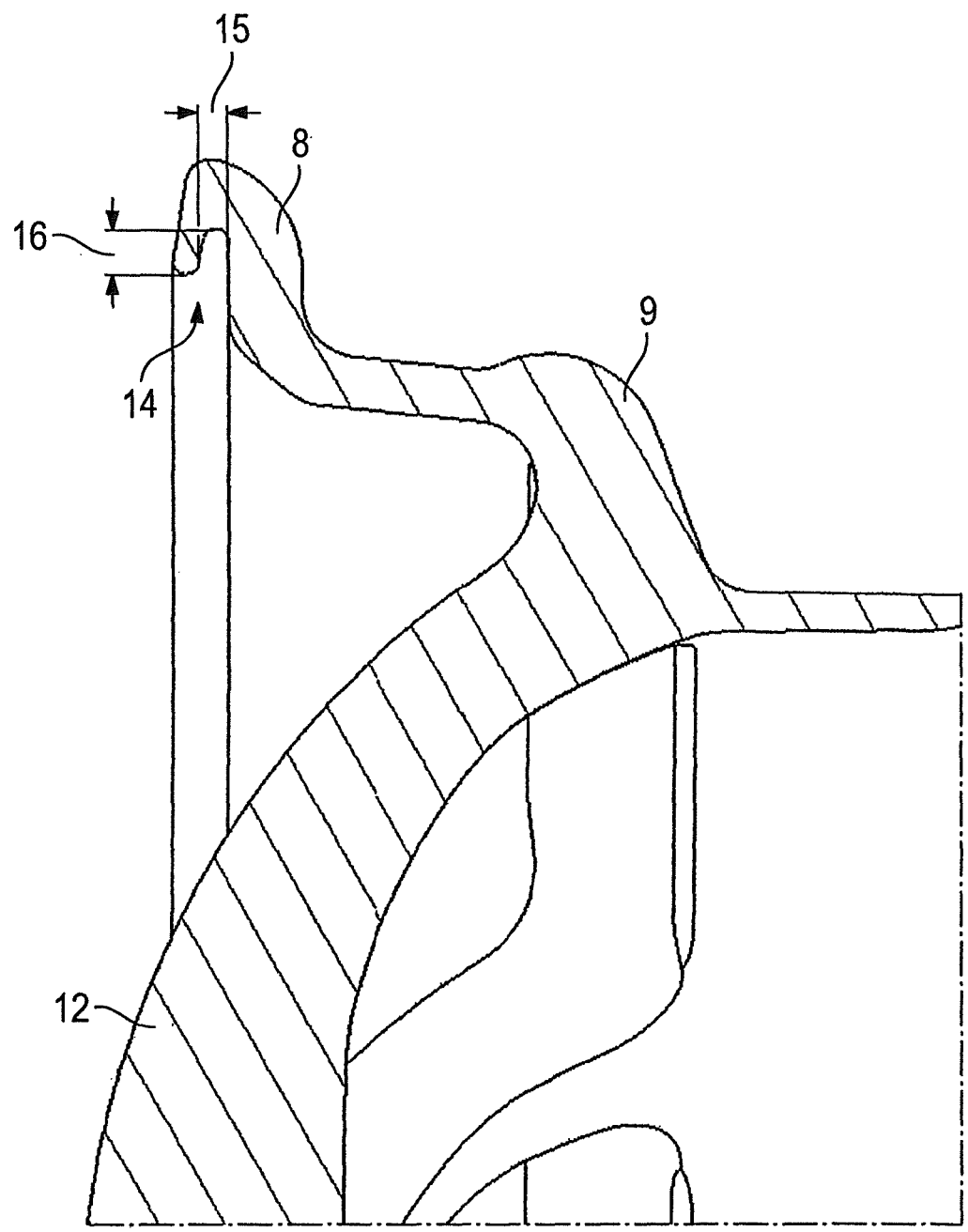
FIG. 2 shows a detail of the rim assembly according to the invention with the covering blanked out.
Figure 3:
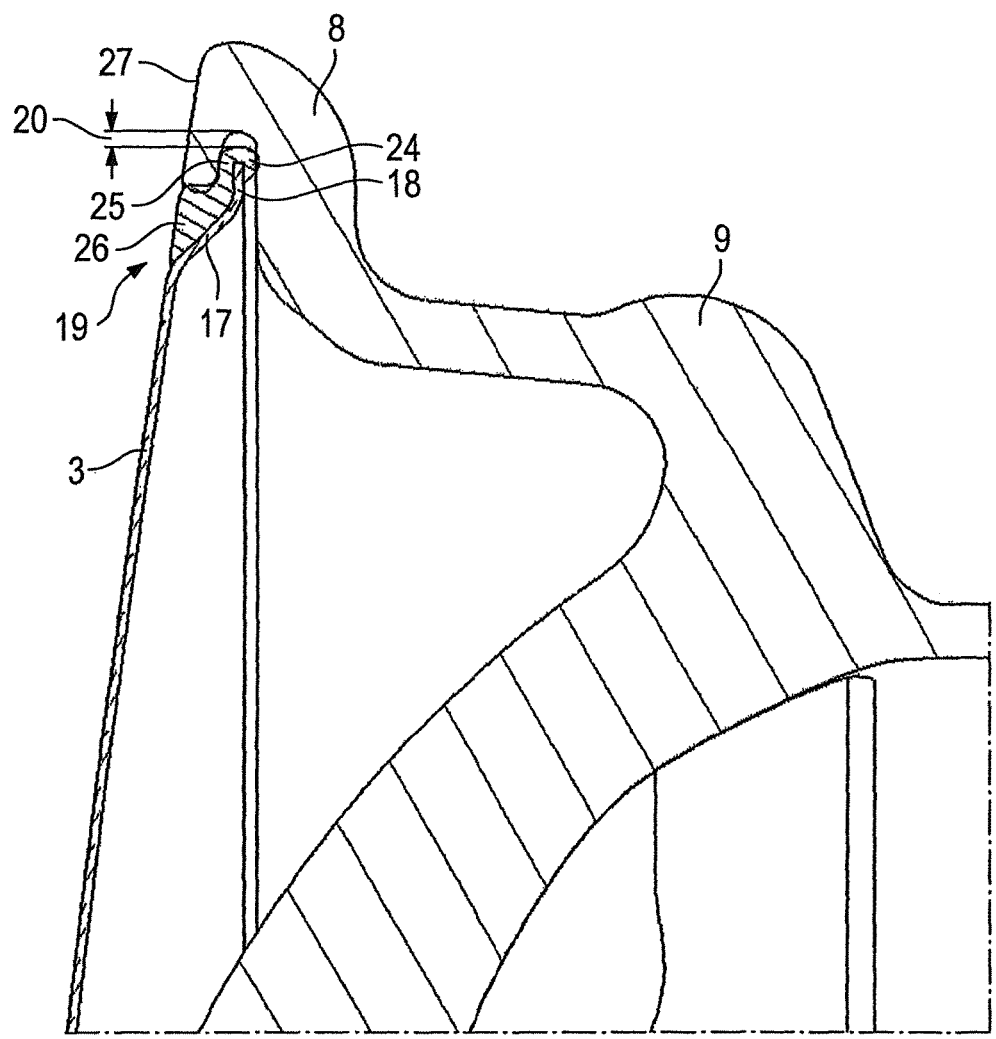
FIG. 3 shows a first detail from FIG. 1.
Figure 4:
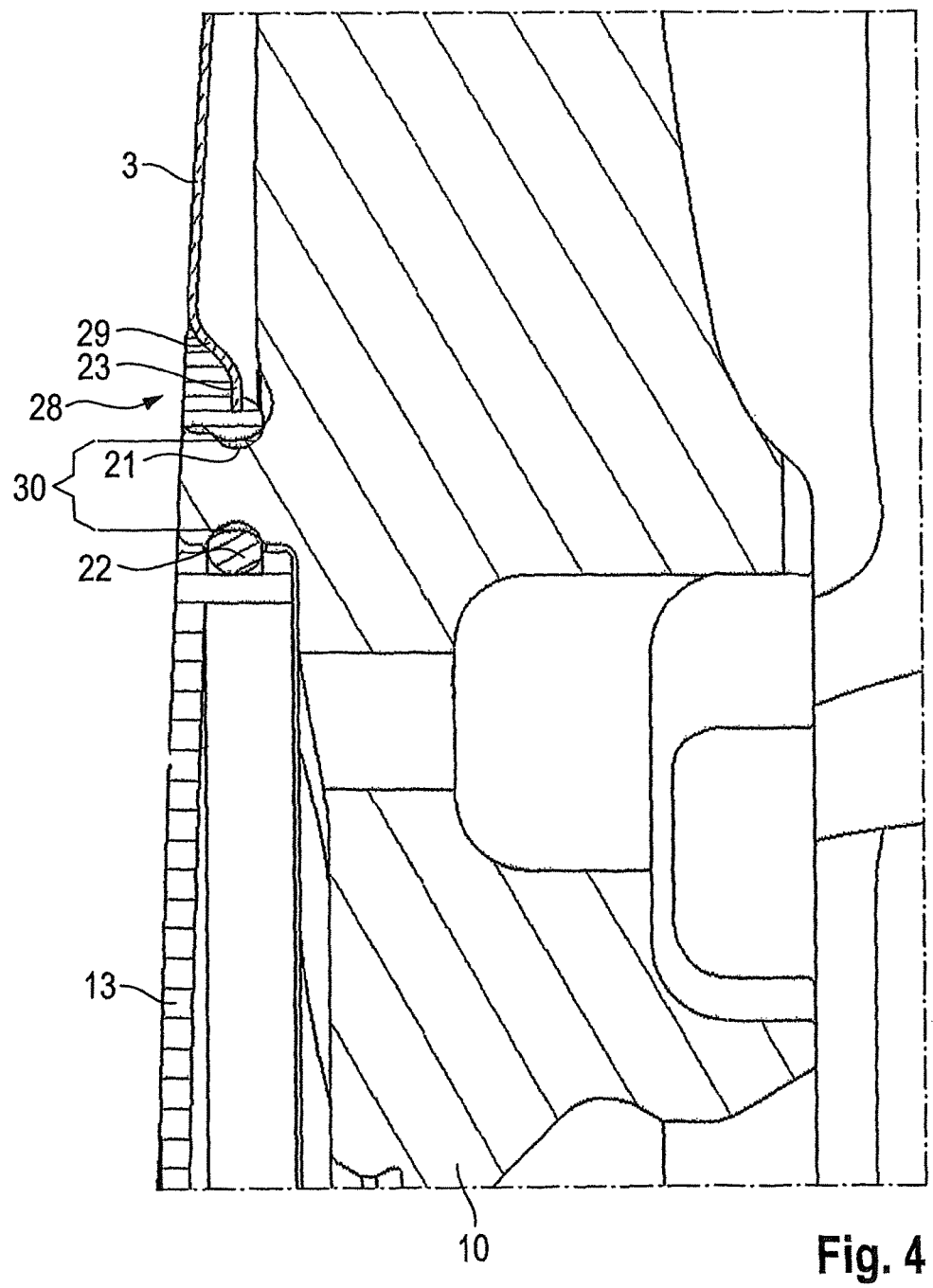
FIG. 4 shows a second detail from FIG. 1.

FIG. 1 shows the rim 2 with the fitted covering 3 in a sectional view. In FIG. 2, the covering 3 is blanked out. FIG. 3 shows a first detailed view from FIG. 1. FIG. 4 shows a second detailed view from FIG. 1.

The rim assembly 1 comprises the rim 2, preferably made of light metal, and the covering 3, preferably made from fiber-reinforced plastic. The rim 2 is fastened to a vehicle so as to be rotatable about an axis 4. The side facing the vehicle is referred to as the axial inner side 5. The outwardly visible side is the axial outer side 6. A radial direction 7 is defined perpendicularly to the axis 4.

The rim 2 has a rim flange 8 facing the axial outer side 6, and a hump 9. The rim 2 furthermore comprises a hub 10. Fastening holes 11 are formed in the hub 10. The rim 2 is screwed to the vehicle via the fastening holes 11. A plurality of spokes 12 extend in the radial direction 7 from the hub 10.

The region from the hub 10 to the rim flange 8 is covered by the annular covering 3. The hub 10 and therefore the fastening holes 11 are covered by a hub cover 13.

According to FIG. 2, the rim 2 has an annular first groove 14. The first groove 14 is located in the rim flange 8 or axially outside the rim flange 8. The first groove 14 is positioned radially outside the hump 9 and is open in the radial direction 7 toward the center of the rim 2. A width 15 of the first groove 14 is defined in the axial direction. The width 15 is measured at the widest point of the first groove 14. A depth 16 of the first groove 14 is defined in the radial direction 7. The depth 16 of the first groove 14 is greater than the width 15. This ensures that the covering 3 readily sits in the first groove 14 and, by way of the corresponding depth 16, has a sufficient clearance 20 in the radial direction 7.

FIG. 3 shows a radially outer edge 18 of the covering 3 in detail. The covering 3 has an oblique portion 17 radially within the radially outer edge 18.

A first elastic element 19 is vulcanized onto the radially outer edge 18 of the covering 3 over the entire circumference. The first elastic element 19 is composed, for example, of rubber. The first elastic element 19 has a first part 24, a second part 25 and a third part 26. The first part 24 is located axially within the covering 3. The second part 25 is located axially outside the covering 3. These two parts 24, 25 fix the covering 3 in the first groove 14 in the axial direction.

The rim 2 has a web 27, as viewed in cross section. This web 27 forms the axially outer wall of the first groove 14. Furthermore, the web 27 has a radially inner end. The oblique portion 17 of the covering 3 lies opposite the radially inner end of the web 27. The third part 26 of the first elastic element 19 is located between the portion 17 and the radial end of the web 27. The third part 26 clamps the covering 3 in the radial direction 7.

The covering 3 and the first elastic element 19 are dimensioned in such a manner that the clearance 20 remains in the first groove 14 in the radial direction 7.

FIG. 4 shows that the covering 3 comprises a central recess in the region of the hub 10. A radially inner edge 23 of the covering 3 is thereby produced. The radially inner edge 23 sits in a second groove 21 of the rim 2. The second groove 21 is configured annularly and is open outward in the radial direction 7. A second elastic element 28 is arranged in order to fix the radially inner edge 23 in the second groove 21. The second elastic element 28 engages around the radially inner edge 23, and therefore the covering 3 is also fixed in this region in both axial directions. Furthermore, the covering 3 has a further oblique portion 29 in the region of the radially inner edge 23 in order to support the covering 3 in the radial direction 7 by the second elastic element 28.

FIG. 4 shows that the hub cover 13 is fastened in the rim 2 by an O ring 22. The rim 2 has an annular extension 30 between the hub cover 13 and the covering 3. The second groove 21 is formed radially outside the annular extension 30. The hub cover 13 is fastened radially within the extension 30 by the O ring 22.

The extension 30, the hub cover 13 and the covering 3 are preferably aligned on the axial outer side 6 of the rim assembly 1 such that an optically and aerodynamically closed outer surface is produced here.

LIST OF REFERENCE NUMBERS

1 Rim assembly
2 Rim
3 Covering
4 Axis
5 Axial inner side
6 Axial outer side
7 Radial direction
8 Rim flange
9 Hump
10 Hub
11 Fastening
12 Spokes
13 Hub cover
14 First groove
15 Width
16 Depth
17 Oblique portion
18 Radially outer edge
19 First elastic element
20 Clearance
21 Second groove
22 O ring
23 Radially inner edge
24 First part
25 Second part
26 Third part
27 Web
28 Second elastic element
29 Further oblique portion
30 Extension The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rim assembly for a vehicle, comprising
a rim with an axial inner side configured to face the vehicle and an axial outer side configured to face away from the vehicle;
a rim flange formed on the axial outer side of the rim;
a first groove formed in the rim, wherein the first groove is arranged in the rim flange or axially outside the rim flange;
a disk-shaped covering which covers the axial outer side of the rim and the radially outer edge of which is inserted in the first groove; and
a first elastic element in the first groove configured to clamp the radially outer edge,
wherein the first elastic element engages around the radially outer edge of the covering such that a first part of the first elastic element bears on the axial inner side of the covering and a second part of the first elastic element bears on the axial outer side of the covering,
wherein a width at a widest point of the first groove, as measured in the axial direction, is smaller than a depth at a deepest point of the first groove, as measured in the radial direction,
wherein the first groove includes an axially outer wall formed by the rim,
wherein the covering includes an oblique portion at least partially extending radially outward, and
wherein a third part of the first elastic element is clamped radially between the outer wall and the oblique portion.

2. The rim assembly as claimed in claim 1, where the first elastic element is one of vulcanized and adhesively bonded onto the radially outer edge of the covering.

3. The rim assembly as claimed in claim 1, wherein the first elastic element is arranged in its entirety around the radially outer edge of the covering.

4. The rim assembly as claimed in claim 1, wherein the first groove is open in the radial direction toward the center of the rim.

5. The rim assembly as claimed in claim 1, wherein the first elastic element in the first groove has a clearance of at least 1 mm in the radial direction.

6. The rim assembly as claimed in claim 1, wherein the covering is of annular design and has a central recess, wherein the central recess provides at least one of an opening for a hub of the rim and access to fastening holes of the rim.

7. The rim assembly as claimed in claim 6, wherein a radially inner edge of the covering sits in a second groove of the rim, wherein a second elastic element is arranged in the second groove for clamping the radially inner edge.

8. The rim assembly as claimed in claim 7, wherein the second elastic element is one of vulcanized and adhesively bonded onto the radially inner edge of the covering.

9. The rim assembly as claimed in claim 7, wherein the second elastic element engages around the radially inner edge of the covering such that the second elastic element bears on the axial inner side of the covering and on the axial outer side of the covering.

10. The rim assembly as claimed in claim 1, wherein the covering is composed of fiber-reinforced plastic.

11. A method for installing a rim assembly for a vehicle, comprising the acts of:
cambering a disk-shaped covering such that the outside diameter of the covering is reduced;
positioning the covering on a rim having an encircling first groove, wherein the rim has an axial inner side configured to face the vehicle and an axial outer side configured to face away from the vehicle; and
releasing the cambered covering such that a radially outer edge of the covering slides into the first groove,
wherein a first elastic element is provided in the first groove for clamping the radially outer edge,
wherein the first elastic element is one of vulcanized and adhesively bonded onto the radially outer edge of the covering before the cambered covering is released, and
wherein the first elastic element engages around the radially outer edge of the covering such that a first part of the first elastic element bears on the axial inner side of the covering and a second part of the first elastic element bears on the axial outer side of the covering,
wherein a width at a widest point of the first groove, as measured in the axial direction, is smaller than a depth at a deepest point of the first groove, as measured in the radial direction, wherein the first groove includes an axially outer wall formed by the rim,
wherein the covering includes an oblique portion at least partially extending radially outward, and
wherein a third part of the first elastic element is clamped radially between the outer wall and the oblique portion.

\* \* \* \* \*